United States Patent
Yoon

(10) Patent No.: US 8,956,752 B2
(45) Date of Patent: Feb. 17, 2015

(54) BATTERY MODULE

(75) Inventor: Ji-Hyoung Yoon, Yongin-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 564 days.

(21) Appl. No.: 13/067,564

(22) Filed: Jun. 9, 2011

(65) Prior Publication Data

US 2012/0214045 A1    Aug. 23, 2012

(30) Foreign Application Priority Data

Feb. 18, 2011  (KR) .................. 10-2011-0014639

(51) Int. Cl.
| | | |
|---|---|---|
| *H01M 10/50* | (2006.01) | |
| *H01M 2/10* | (2006.01) | |
| *H01M 10/04* | (2006.01) | |
| H01M 10/613 | (2014.01) | |
| H01M 10/6557 | (2014.01) | |
| H01M 10/6563 | (2014.01) | |

(52) U.S. Cl.
CPC ........ *H01M 2/1077* (2013.01); *H01M 10/0413* (2013.01); *H01M 10/0481* (2013.01); *H01M 10/5004* (2013.01); *H01M 10/5059* (2013.01); *H01M 10/5067* (2013.01)
USPC ........................................................ 429/120

(58) Field of Classification Search
USPC ......................................................... 429/151
See application file for complete search history.

(56) References Cited

U.S. PATENT DOCUMENTS

| | | | |
|---|---|---|---|
| 4,113,926 A | 9/1978 | McBrien | |
| 7,507,124 B2 | 3/2009 | Kim | |
| 2005/0250386 A1 | 11/2005 | Kim | |
| 2006/0216582 A1* | 9/2006 | Lee et al. ...................... | 429/120 |
| 2007/0026303 A1* | 2/2007 | Jeon et al. ..................... | 429/143 |
| 2009/0111010 A1* | 4/2009 | Okada et al. .................. | 429/120 |
| 2010/0129706 A1 | 5/2010 | Matthias | |
| 2012/0070718 A1 | 3/2012 | Motohashi | |

FOREIGN PATENT DOCUMENTS

| | | | |
|---|---|---|---|
| FR | 2362497 | A1 | 3/1978 |
| GB | 2465481 | A | 5/2010 |
| JP | 2002-245992 | A | 8/2002 |
| JP | 2004-227788 | A | 8/2004 |
| JP | 2006-048996 | A | 2/2006 |
| JP | 2008-235149 | A | 10/2008 |
| KR | 10-2006-0104071 | A | 10/2006 |
| KR | 10-2006-0118797 | A | 11/2006 |
| KR | 10-0684861 | B1 | 2/2007 |
| KR | 10-2007-0105115 | A | 10/2007 |

(Continued)

OTHER PUBLICATIONS

European Search Report in EP 11183180.6-1227, dated May 14, 2012 (Yoon).

(Continued)

*Primary Examiner* — Ula C. Ruddock
*Assistant Examiner* — Jacob Marks
(74) *Attorney, Agent, or Firm* — Lee & Morse, P.C.

(57) ABSTRACT

A battery module including a plurality of battery cells aligned in one direction; and barriers interposed between respective battery cells, wherein the barrier has a shape that crosses at a central portion of the battery cell.

15 Claims, 8 Drawing Sheets

(56) References Cited

FOREIGN PATENT DOCUMENTS

| WO | WO 2008/078635 A1 | 7/2008 |
| WO | WO 2011/030194 A1 | 3/2011 |

OTHER PUBLICATIONS

Korean Notice of Allowance in KR 10-2011-0014639, dated Jan. 31, 2013 (Yoon).

* cited by examiner

BATTERY MODULE

BACKGROUND

1. Field

Embodiments relate to a battery module.

2. Description of the Related Art

A high-power battery module using battery cells having a non-aqueous electrolyte with high energy density has recently been developed. The high-power battery module may be configured as a large-capacity battery module manufactured by connecting a plurality of the battery cells in series so as to be used in driving motors of devices requiring high power, e.g., electric vehicles and the like.

The battery cell includes the electrolyte and an electrode assembly (composed of a positive plate and a negative electrode plate). The battery cell generates energy through an electrochemical reaction of these electrode plates and the electrolyte. Gas may be generated as a side reaction of the electrochemical reaction in an interior of the battery cell.

SUMMARY

Embodiments are directed to a battery module.

The embodiments may be realized by providing a battery module including a plurality of battery cells aligned in one direction; and barriers interposed between respective battery cells, wherein the barrier has a shape that crosses at a central portion of the battery cell.

The barrier may have an X-shape.

The barrier may include at least one rib connecting ends of the barrier.

The barrier may have a size and a shape corresponding to a size and a shape of the battery cell.

The barrier may include at least one protruding portion thereon.

The protruding portion may have a circular or square shape.

The barrier may further include fixing portions thereon, the fixing portions fixing a position of the battery cell.

Each of the fixing portions may have a flange shape bent at an edge of the barrier that fixes at least a portion of the battery cell.

The fixing portions may extend in one direction from one surface of the barrier.

The fixing portions may include first and second fixing portions, the first fixing portion extending perpendicularly from one surface of the barrier, and the second fixing portion extending perpendicularly from another surface of the barrier, the other surface being opposite to the one surface.

The battery module may further include a housing that accommodates the battery cells and the barriers.

The housing may include a pair of first and second end plates respectively disposed at outsides of the battery cells, and connection members connecting the first and second end plates to each other.

The connection members may include side members respectively supporting side surfaces of the battery cells, and a bottom member supporting bottom surfaces of the battery cells.

The barrier may be made of a material including at least one of Al, Cu, stainless steel, and alloys thereof.

BRIEF DESCRIPTION OF THE DRAWINGS

The embodiments will become more apparent to those of ordinary skill in the art by describing in detail exemplary embodiments with reference to the attached drawings, in which.

DETAILED DESCRIPTION

Figure 1A:
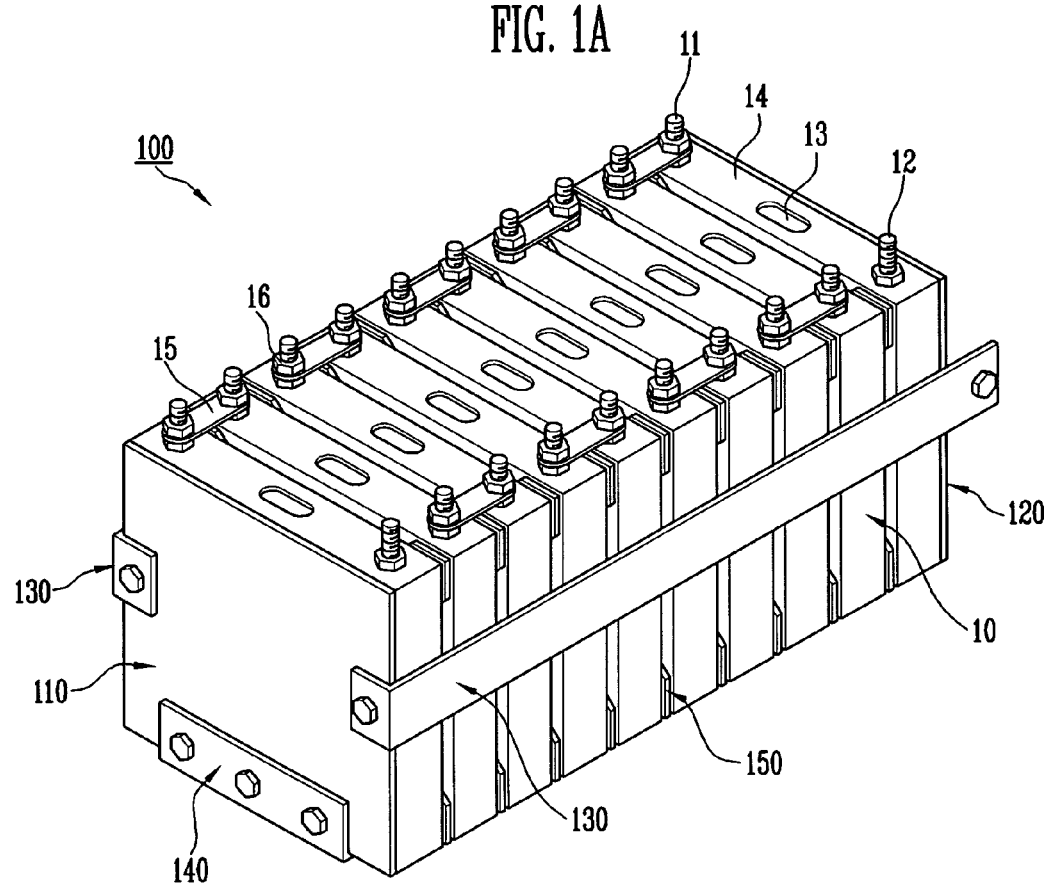
FIG. 1A illustrates a perspective view of a battery module according to an embodiment.

Korean Patent Application No. 10-2011-0014639, filed on Feb. 18, 2011, in the Korean Intellectual Property Office, and entitled: "Battery Module" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

An embodiment will be described with reference to FIGS. 1A to 2B.

Figure 1B:
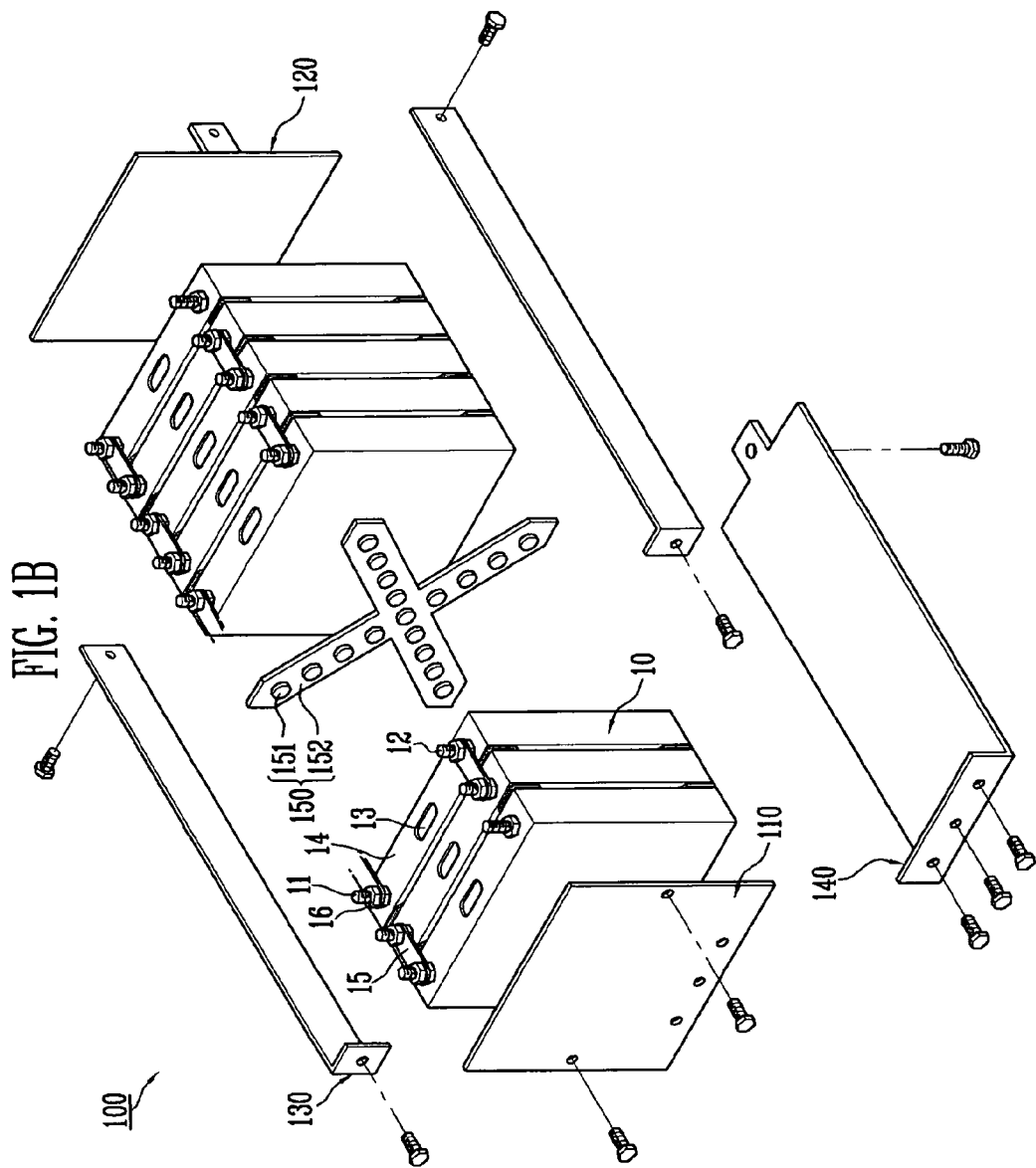
FIG. 1B illustrates an exploded perspective view of the battery module of FIG. 1A.

FIG. 1A illustrates a perspective view of a battery module according to an embodiment. FIG. 1B illustrates an exploded perspective view of the battery module of FIG. 1A.

The battery module 100 may include a plurality of battery cells 10 (aligned in one direction) and barriers 150 interposed between respective battery cells 10. The barrier 150 may have a shape crossing at a center of a corresponding battery cell 10. The battery module 100 may further include a housing 110, 120, 130, and 140 that accommodates the battery cells 10 and the barriers 150. The barriers 150 may have an X-shape. For example, the barrier 150 may include an X-shaped member 152 and at least one protruding portion 151 protruding from the X-shaped member 152. In an implementation, the protruding portion 151 may protrude from a surface of the X-shaped member 152.

The battery cell 10 may include a battery case having an opening and a cap plate 14 that seals the opening. The battery cell 10 may be manufactured by accommodating an electrode assembly (not illustrated) and an electrolyte (not illustrated)

in the battery case. The electrode assembly may include a positive electrode plate, a negative electrode plate, and a separator interposed therebetween. A positive electrode terminal 11 and a negative electrode terminal 12 may protrude at respective ends of the cap plate 14. In an implementation, the positive electrode terminal 11 may be connected to the positive electrode plate of the electrode assembly; and the negative electrode terminal 12 may be connected to the negative electrode plate of the electrode assembly. The positive and negative electrode plates may generate energy through an electrochemical reaction with the electrolyte; and the generated energy may be transferred to an exterior of the battery cell 10 through the positive and negative electrode terminals 11 and 12. A vent 13 may be provided between the positive and negative electrode plates 11 and 12 of the cap plate 14. The vent 13 may serve as a path along which gas generated in the interior of the battery cell 10 is exhausted to the exterior of the battery cell 10.

The housing 110, 120, 130, and 140 may include a pair of first and second end plates 110 and 120 (respectively disposed at outsides of the battery cells 10) and connection members 130 and 140 (that connect the first and second end plates 110 and 120 to each other).

The plurality of battery cells 10 may be aligned in one direction within a space defined by the first and second end plates 110 and 120 and the connection members 130 and 140. The plurality of battery cells 10 may be aligned in parallel to one another so that wide front surfaces thereof face one another. Thus, the positive and negative electrode terminals 11 and 12 of neighboring battery cells 10 may be electrically connected to each other by a bus-bar 15. The bus-bar 15 may include holes through which the positive and negative electrode terminals 11 and 12 respectively pass. The bus-bar 15 (connected to the terminals respectively passing through the holes) may be fixed by a member including, e.g., a nut 16 or the like.

The connection members 130 and 140 may include side members 130 (that support side surfaces of the battery cells 10) and a bottom member 140 (that supports bottom surfaces of the battery cells 10). One end of each of the side and bottom members 130 and 140 may be fastened to the first end plate 110; and another end of each of the side and bottom members 130 and 140 may be fastened to the second end plate 120. In an implementation, the first and second end plates 110 and 120 and the side and bottom members 130 and 140 may be fastened together by members including, e.g., bolts, nuts and the like.

The first and second end plates 110 and 120 may come in surface contact with outermost battery cells 10, respectively, so as to press the plurality of battery cells 10 toward an inside of the plurality of battery cells 10. In an implementation, the positive and negative electrode terminals 11 and 12 of the plurality of battery cells 10 (supported by the first and second end plates 110 and 120, the side members 130, and the bottom member 140) may be alternately aligned, so that the plurality of battery cells may be connected in series to one another.

The housing 110, 120, 130, and 140 may stably fix the plurality of battery cells 10. However, the embodiments are not limited to the structure described above. For example, the housing may be variously modified and implemented. The connection structure and number of the battery cells 10 may be variously modified according to the design of the battery module 100.

Figure 2A:
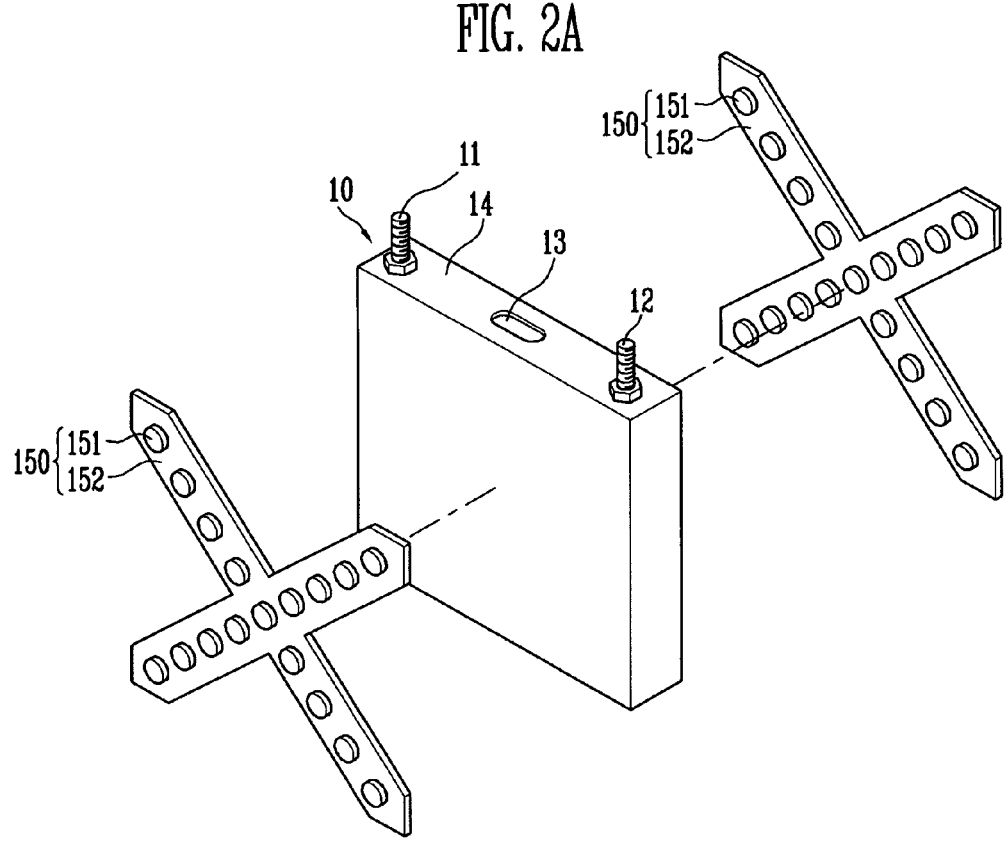
FIG. 2A illustrates a perspective view of barriers and a battery cell of the battery module of FIG. 1B.
Figure 2B:
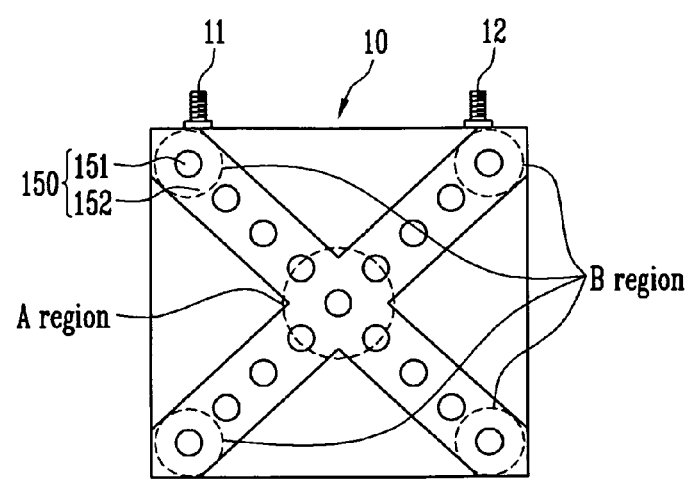
FIG. 2B illustrates a front view of the barriers and battery cell of FIG. 2A.

FIG. 2A illustrates a perspective view of barriers and a battery cell of the battery module of FIG. 1B. FIG. 2B illustrates a front view of the barriers and battery cell of FIG. 2A.

Referring to FIGS. 2A and 2B, the barriers 150 may be interposed between the battery cells 10. The barrier 150 may include the X-shaped member 152 (approximately provided to cross at a center of the battery cell 10) and at least one protruding portion 151 on the X-shaped member 152. The at least one protruding portion 151 may be on at least one of first and second surfaces of the barrier 150. In an implementation, the at least one protruding portion 151 may be on a surface of the barrier 150 that comes in contact with the battery cell 10.

The barrier 150 may be interposed between neighboring battery cells 10 so that the battery cells 10 may be spaced apart from each other. Thus, an empty or open space may be provided between the battery cells 10. The space may serve as a path through which heat generated in the battery cells 10 is discharged so that the heat is not accumulated. Alternatively, the space may serve as a path for a coolant for cooling the battery cells 10.

Generally, battery cells for HEV, PHEV, and EV may include a structure capable of pressing the battery cells at a certain pressure or higher so as to control swelling of the battery cells in a charging/discharging process. Therefore, a barrier having a size and shape corresponding to the size and shape of the battery cells may be interposed between the battery cells. As the number of battery cells is increased, the number of barriers may also be increased. Accordingly, the weight of a battery module may be increased. In order to prevent the increase in the weight of the battery module, a barrier capable of decreasing the weight of the battery module while still preventing the swelling of the battery cells is desirable.

Accordingly, the barrier according to the embodiments may include the X-shaped member 152 and protruding portions 151 on the X-shaped member 152. The protruding portions 151 may be spaced apart from one another at a predetermined interval on the X-shaped member 152.

As charging/discharging of the battery cell 10 is repeated, the battery cell 10 may be degraded. The thickness of the degraded battery cell 10 may be greater in a central portion thereof when compared to other neighboring or peripheral portions. For example, the battery cell 10 may tend to be swollen in an approximately X-shape. Thus, the barrier 150 may be manufactured by basically using a structure capable of restricting the X-shaped swelling axis of the battery cell 10, and other unnecessary portions may be omitted. Accordingly, the weight of the barrier 150 may be reduced while still maintaining the, e.g., pressing, function of the barrier 150. Accordingly, it is possible to reduce the weight of the battery module including the barriers 150.

FIG. 2B illustrates a front view of the battery cell 10 interposed between the barriers 150. The barriers 150 may be provided so that ends of each of the barriers 150 correspond to outer edges or corners of the battery cell 10. For example, the barrier 150 may have a similar size to or may be slightly smaller than the battery cell 10, and may correspond to diagonal lines obtained by connecting opposing corners of the battery cell 10. The barrier 150 may be made of a material having high thermal conductivity and excellent rigidity. For example, the barrier 150 may include any one or more of Al, Cu, stainless steel, and alloys thereof.

The barrier 150 may include a region A (e.g., a central portion of the X-shaped member 152) and, e.g., four, regions B (e.g., ends connected to the central portion).

The region A may correspond to the central portion of the battery cell 10, so that it is possible to reduce the weight of the barrier 150 while effectively preventing the swelling of the battery cell 10 and to reduce production costs. The region A may also provide a flow path to the X-shaped member 152, along which a coolant may be moved by the spaced protruding portions 151.

The regions B of the barrier 150 may correspond to respective edges, ends, or corners of the battery cell 10. Swelling of the battery cell 10 may not occur to a significant degree at the ends or edges of the battery cell 10. For example, in the regions B of the barrier 150, deformation, e.g., swelling, may not be caused by the degradation of the battery cell 10. Thus, the regions B of the barrier 150 may come in close contact with the battery cell 10, so that the battery cell 10 may not be moved by an external force and may be stably fixed.

Hereinafter, other embodiments will be described with reference to FIGS. 3A to 8. In these embodiments, details except the following description are similar to those described in FIGS. 1A to 2B, and therefore, repeated detailed descriptions thereof will be omitted.

Figure 3A:
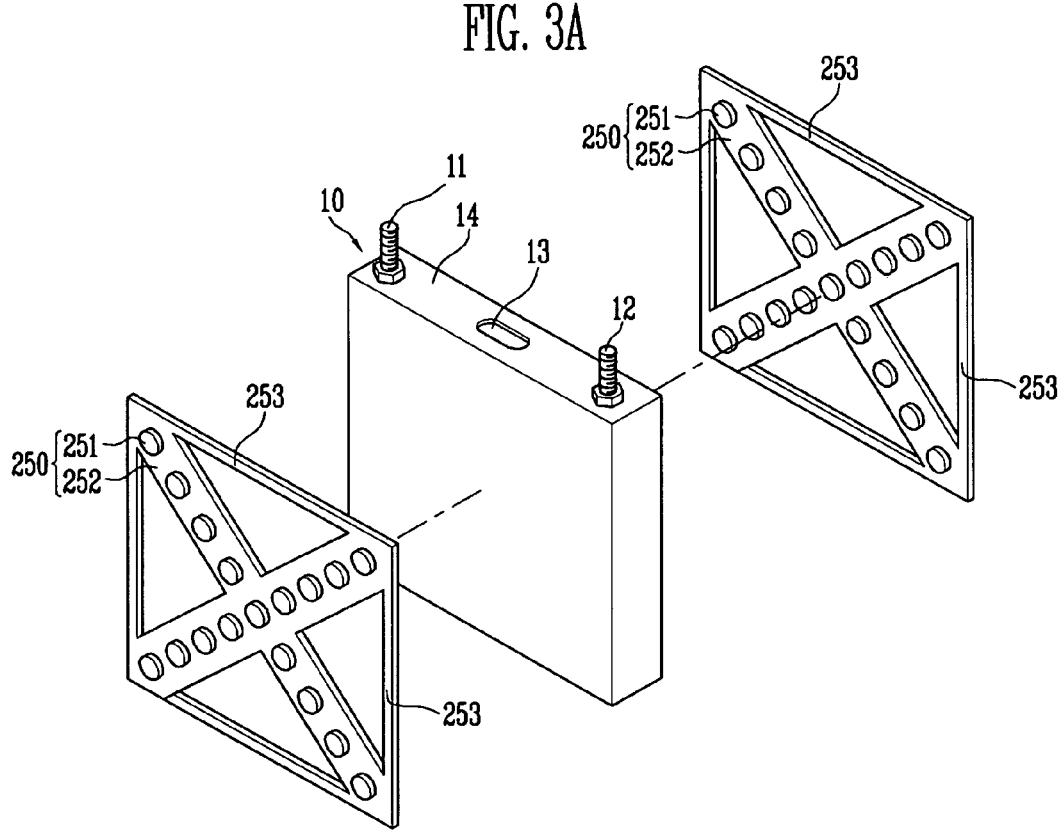
FIG. 3A illustrates a perspective view of barriers and a battery cell according to another embodiment.
Figure 3B:
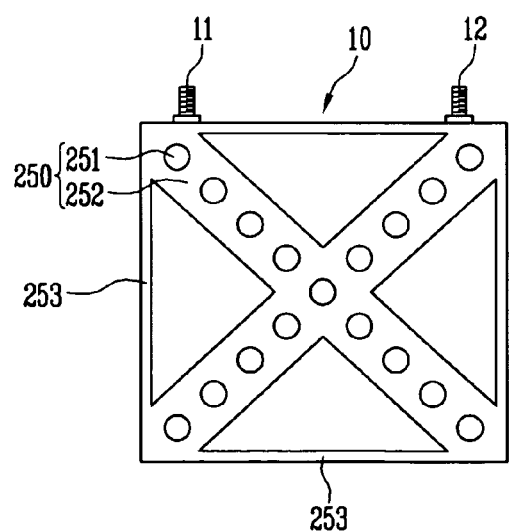
FIG. 3B illustrates a front view of the barriers and battery cell of FIG. 3A.

FIG. 3A illustrates a perspective view of barriers and a battery cell according to another embodiment. FIG. 3B illustrates a front view of the barriers and battery cell of FIG. 3A.

The battery module according to the present embodiment may include a plurality of battery cells 10 (aligned in one direction), barriers 250 (interposed between respective battery cells 10), and a housing that accommodates the battery cells 10 and the barriers 250. The barrier 250 may include an X-shaped member 252 and at least one protruding portion 251 on the X-shaped member 252. The barrier 250 may further include at least one rib 253 connecting ends of the barrier 250, e.g., ends of the X-shaped member 252, to each other.

Referring to FIGS. 3A and 3B, the at least one rib 253 may have a shape corresponding to an outer edge of the battery cell 10. The at least one rib 253 may connect ends of the barrier 250, e.g., ends of the X-shaped member 252. In an implementation, a plurality of ribs 253 may be included and the ribs 253 may connect all ends of the X-shaped member 252.

In the barrier 250 of the present embodiment, ends of the X-shaped member 252 may be connected to each other by the rib 253. The ribs 253 may connect the ends of the X-shaped member 252, so that it is possible to complement the structure of the barrier 250, thereby increasing rigidity of the barrier 250. Thus, in a case where the thickness of the barrier 250 is decreased or where the barrier 250 is made of a relatively soft material, the ribs 253 may add support to the barrier 250, so that the barrier 250 may be stably used.

As shown in FIG. 3B, the barrier 250 (having the ends thereof, e.g., ends of the X-shaped members 252, connected by the ribs 253) may have a size and shape corresponding to the size and shape of battery cell 10. Thus, it is possible to fix the positions of the plurality of the battery cells 10 and to facilitate alignment of the barriers 250 between the respective battery cells 10.

Figure 4:
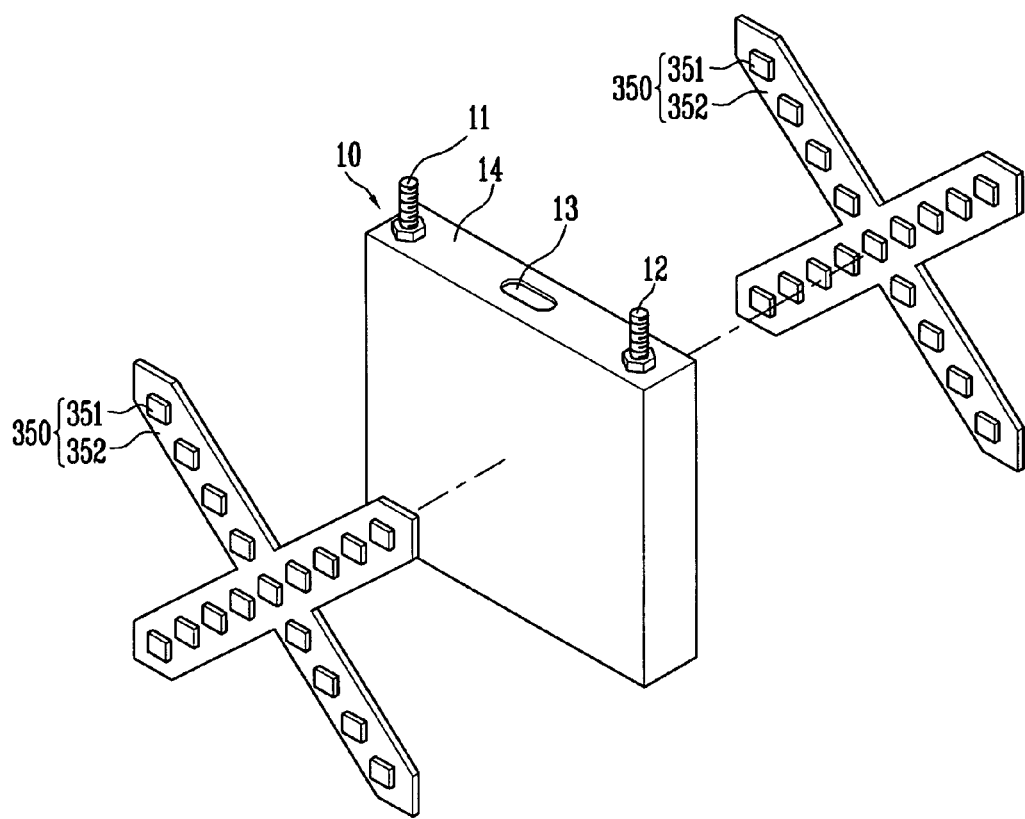
FIG. 4 illustrates a perspective view of barriers and a battery cell according to yet another embodiment.
Figure 5:
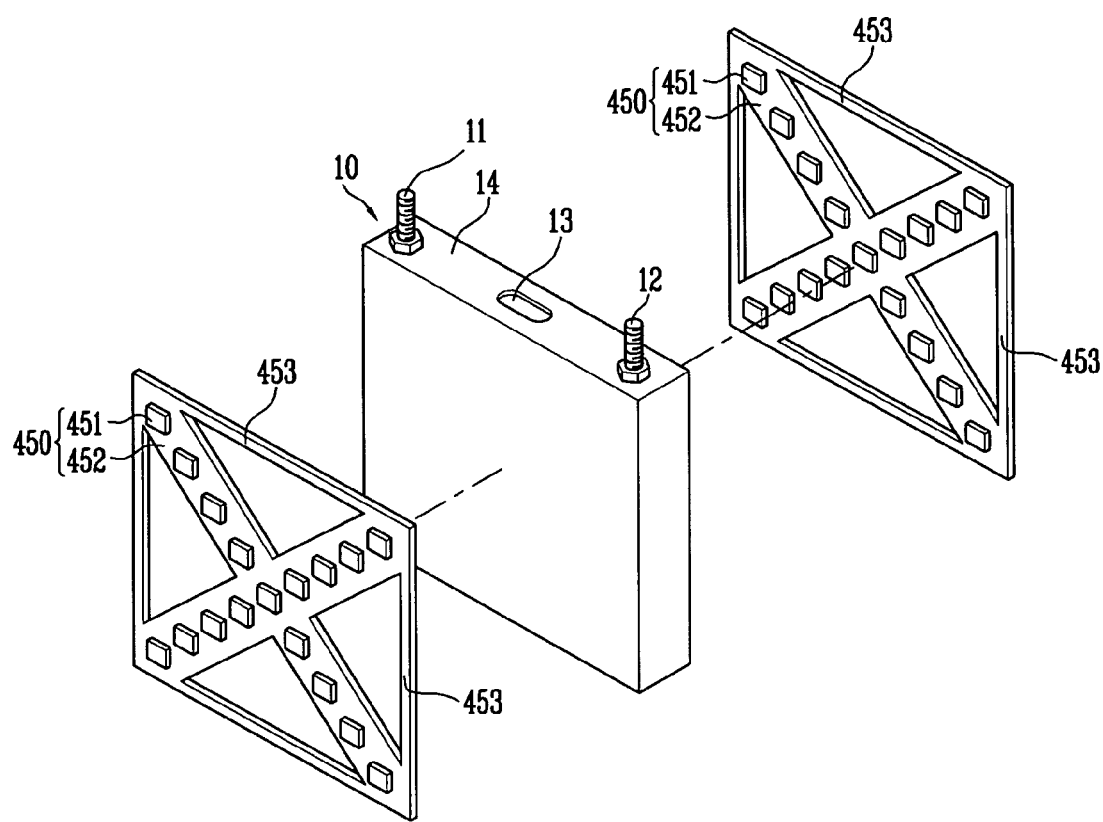
FIG. 5 illustrates a perspective view of barriers and a battery cell according to still another embodiment.

FIGS. 4 and 5 illustrate perspective views of barriers and battery cells according to other embodiments.

Referring to FIG. 4, a battery module may include a plurality of battery cells 10 (aligned in one direction), barriers 350 (between the battery cells 10), and a housing that accommodates the battery cells 10 and the barriers 350. The barrier 350 may include an X-shaped member 352 and at least one protruding portion 351 on the X-shaped member 352. In an implementation, the at least one protruding portion 351 may have a circular or square shape on the X-shaped member 352.

The protruding portions 351 may facilitate spacing apart of the barrier 350 and the battery cell 10 so as to provide a flow path along which air or a coolant may be moved. However, the embodiments are not limited to the shape of the protruding portions 351. For example, the protruding portions 351 have various shapes, e.g., triangular, rectangular, etc. The protruding portions 351 may be integrally provided on the X-shaped member 352. Alternatively, the protruding portions 351 may be separately formed and attached to the X-shaped member 352. The shape of the protruding portions 351 may be modified as desired so that the barrier 350 may perform the optimal function according to the shape or size of the battery cell 10. In a case where the protruding portions 351 are integrally formed with the X-shaped member 352 as described in this embodiment, the cost of the barrier 350 may be decreased, thereby reducing the material cost of the battery module.

Referring to FIG. 5, a barrier 450 interposed between battery cells 10 may include an X-shaped member 452 and protruding portions 451 having a square shape on the X-shaped member 452. Ends of the X-shaped member 452 may be connected to each other by a rib 453.

The rib 453 may have a size and shape corresponding to the size and shape of the battery cell 10. For example, the ribs 453 may correspond to edges and corners of the battery cell 10 so that it is possible to complement rigidity of the barrier 450 and to facilitate alignment of the battery cells 10. In an implementation, one rib 453 may be provided on the X-shaped member 452. In another implementation, the number and connection of the ribs 453 may be variously modified according to the design of the battery module.

Figure 6:
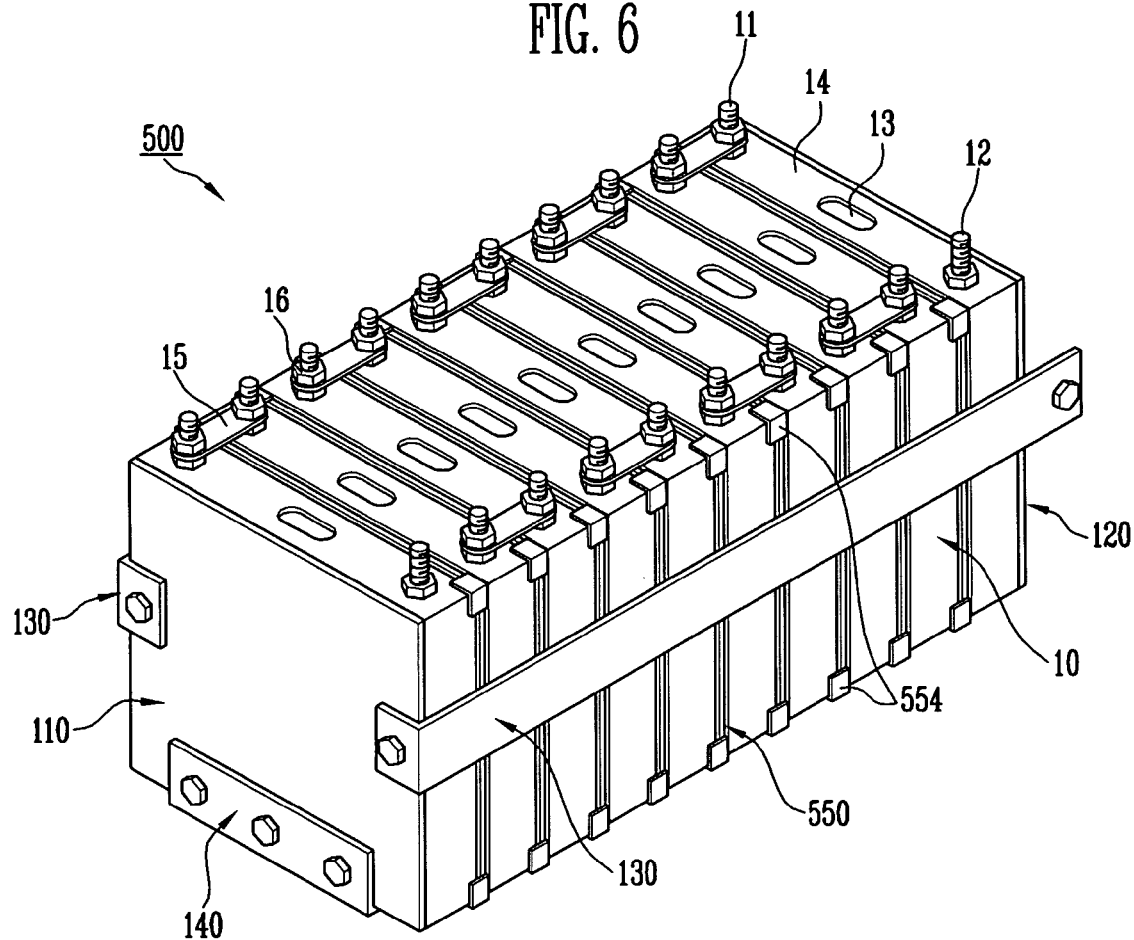
FIG. 6 illustrates a perspective view of a battery module according to still another embodiment.
Figure 7:
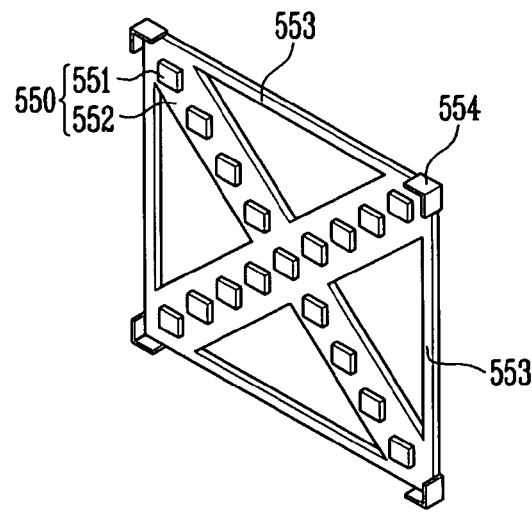
FIG. 7 illustrates a perspective view of a barrier of the battery module of FIG. 6.

FIG. 6 illustrates a perspective view of a battery module according to still another embodiment. FIG. 7 illustrates a perspective view of a barrier of the battery module of FIG. 6.

Referring to FIG. 6, the battery module 500 according to the present embodiment may include a plurality of battery cells 10 (aligned in one direction), barriers 550 (between respective battery cells 10), a pair of first and second end plates 110 and 120 (respectively disposed at outsides of the battery cells 10), and connection members 130 and 140 (that connect the first and second end plates 110 and 120 to each other).

The barrier 550 may include an X-shaped member 552 and at least one protruding portion 551 on the X-shaped member 552. The barrier 550 may further include fixing portions 554 thereon that fix a position of the battery cell 10.

Generally, a plurality of battery cells may be fixed by connecting members such as brackets or plates, rather than by using an integrated housing. In a case where the battery cells are fixed by connecting members, a weight of the battery module may be decreased, as compared with in a case where the battery cells are fixed by using the integrated housing. However, the fixing ability of the battery cells may be lowered. On the other hand, if the number of connecting members used in the battery module is increased to improve the fixing ability, the decrease in the weight of the connecting members may be insufficient, as compared with the integrated housing. Thus, according to an embodiment, it may be desirable that the battery cells 10 be firmly fixed while decreasing the weight of the housing. To this end, the fixing portions 554 may be provided at respective edges or corners of the barrier 550.

The fixing portions 554 may have a flange shape bent at an edge or corner of the barrier 550 so as to fix at least a portion of the battery cell 10. The fixing portions 554 may extend in one direction from one surface of the barrier 550.

The fixing portions 554 (extending or facing in the same direction) may fix the battery cell 10 (stacked in the same direction), so that it is possible to effectively fix a position of the battery cells 10 without increasing a volume and/or weight of the battery module 500. Further, the fixing portions 554 may be modified according to the design of the battery module, thereby improving production efficiency.

Figure 8:
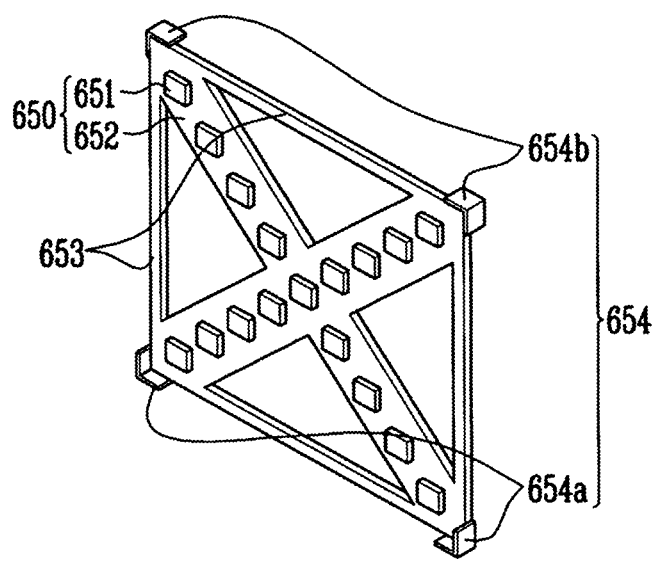
FIG. 8 illustrates a perspective view of a barrier according to still another embodiment.

FIG. 8 illustrates a perspective view of a barrier according to still another embodiment.

Referring to FIG. 8, the barrier 650 may include an X-shaped member 652 that crosses at a central portion of a battery cell (not illustrated), and at least one protruding portion 651 on the X-shaped member 652. The barrier 650 may further include fixing portions 654 thereon that fix a position of the battery cell.

A number of the fixing portions 654 may be two or more; and the fixing portions 654 may include first and second fixing portions 654a and 654b. The first fixing portion 654a may extend in one direction from the X-shaped member 652 to fix a position of a neighboring battery cell; and the second fixing portion 654b may extend in an opposite direction to fix a position of another neighboring battery cell. For example, the first fixing portion 654a may protrude perpendicularly from one surface of the barrier 650; and the second fixing portion 654b may protrude perpendicularly in a direction opposite to the first fixing portion 654a on another surface of the barrier 650.

For example, the first fixing portion 654a of the barrier 650 may extend from a first surface of the barrier 650; and the second fixing portion 654b of the barrier 650 may extend from a second surface of the barrier 650 that is opposite to the first surface of the barrier 650. Thus, the first and second fixing portions 654a and 654b may respectively fix different battery cells. Although the drawing figures illustrate the first and second fixing portions 654a and 654b on lower and upper portions of the barrier 650, respectively, the embodiments are not limited thereto. For example, the positions and number of the first and second fixing portions 654a and 654b may be modified as desired according to the battery module, and thus the design of the battery module may be variously implemented.

By way of summation and review, gas generated in the battery cell may change an external shape of the battery cell. Further, the change in the external shape of the battery cell may have an influence on the shape of a battery module formed by aligning a plurality of battery cells. Therefore, the battery cells may not be firmly fixed in the battery module.

The embodiments provide a battery module including barriers capable of effectively controlling swelling of battery cells.

The embodiments also provide a battery module having reduced weight by reducing unnecessary members thereof.

As described above, according to the embodiments, it is possible to provide a battery module of which weight may be decreased while effectively preventing the swelling of battery cells.

Also, it is possible to provide a battery module capable of reducing production costs by optimizing members that constitute the battery module.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery module, comprising:
   a plurality of battery cells aligned in one direction; and
   a barrier interposed between respective battery cells,
   wherein the barrier has a shape including arms that extend along a straight line from one corner of one battery cell to an opposing corner of the battery cell, the arms crossing at a central portion of the battery cell, and
   wherein the barrier is formed from a thermally conductive material.

2. The battery module as claimed in claim 1, wherein the barrier has an X-shape.

3. The battery module as claimed in claim 1, wherein the barrier includes at least one rib connecting ends of the barrier.

4. The battery module as claimed in claim 1, wherein the barrier has a size and a shape corresponding to a size and a shape of the battery cell.

5. The battery module as claimed in claim 1, wherein the barrier includes at least one protruding portion thereon.

6. The battery module as claimed in claim 5, wherein the protruding portion has a circular or square shape.

7. The battery module as claimed in claim 1, wherein the barrier further includes fixing portions thereon, the fixing portions fixing a position of the battery cell.

8. The battery module as claimed in claim 7, wherein each of the fixing portions has a flange shape bent at an edge of the barrier that fixes at least a portion of the battery cell.

9. The battery module as claimed in claim 8, wherein the fixing portions extend in one direction from one surface of the barrier.

10. The battery module as claimed in claim 8, wherein the fixing portions include first and second fixing portions, the first fixing portion extending perpendicularly from one surface of the barrier, and the second fixing portion extending perpendicularly from another surface of the barrier, the other surface being opposite to the one surface.

11. The battery module as claimed in claim 1, further comprising a housing that accommodates the battery cells and the barrier.

12. The battery module as claimed in claim 11, wherein the housing includes:
   a pair of first and second end plates respectively disposed at outsides of the battery cells, and
   connection members connecting the first and second end plates to each other.

13. The battery module as claimed in claim 12, wherein the connection members include:
   side members respectively supporting side surfaces of the battery cells, and
   a bottom member supporting bottom surfaces of the battery cells.

14. The battery module as claimed in claim 1, wherein the barrier is made of a material including at least one of Al, Cu, stainless steel, and alloys thereof.

15. The battery module as claimed in claim 5, wherein the barrier includes a plurality of protruding portions thereon, the plurality of protruding portions being arranged on the barrier to symmetrically protrude away from opposite sides of the barrier toward the respective battery cells.

* * * * *